(12) United States Patent
Döring

(10) Patent No.: US 8,191,412 B2
(45) Date of Patent: Jun. 5, 2012

(54) DETERMINATION OF FUEL CHARACTERISTICS AND THEIR INFLUENCE ON EXHAUST GAS EMISSIONS DURING OPERATION OF AN INTERNAL COMBUSTION ENGINE

(75) Inventor: Andreas Döring, Munich (DE)

(73) Assignee: Man Truck & Bus AG, München (DE)

( * ) Notice: Subject to any disclaimer, the term of this patent is extended or adjusted under 35 U.S.C. 154(b) by 271 days.

(21) Appl. No.: 12/473,100

(22) Filed: May 27, 2009

(65) Prior Publication Data

US 2010/0132435 A1    Jun. 3, 2010

(30) Foreign Application Priority Data

May 27, 2008   (DE) .................. 10 2008 025 350

(51) Int. Cl.
 *G01M 15/10*        (2006.01)
(52) U.S. Cl. ............... 73/114.71; 73/114.43; 73/114.55
(58) Field of Classification Search ............... 73/114.38, 73/114.43, 114.55, 114.69, 114.71, 114.75
See application file for complete search history.

(56) References Cited

U.S. PATENT DOCUMENTS

| | | | | |
|---|---|---|---|---|
| 7,367,223 | B2* | 5/2008 | Kettl et al. | 73/53.05 |
| 7,996,144 | B2* | 8/2011 | Mallebrein et al. | 701/103 |
| 2005/0224055 | A1* | 10/2005 | Wiese et al. | 123/494 |
| 2007/0163542 | A1* | 7/2007 | Kettl et al. | 123/435 |
| 2008/0035119 | A1* | 2/2008 | Marriott et al. | 123/494 |
| 2009/0178474 | A1* | 7/2009 | Bailey | 73/114.38 |

FOREIGN PATENT DOCUMENTS

| | | |
|---|---|---|
| DE | 4019083 | 12/1991 |
| DE | 195 22 271 | 1/1997 |
| DE | 19955796 | 11/2000 |
| DE | 10015162 | 10/2001 |
| DE | 10152236 | 4/2003 |
| DE | 10217376 | 11/2003 |
| DE | 10217379 | 11/2003 |
| DE | 10346314 | 4/2004 |
| DE | 10 2004 056 893 | 6/2006 |
| WO | WO 2005/021952 | 3/2005 |
| WO | WO 2008/007128 | 1/2008 |

* cited by examiner

*Primary Examiner* — Eric S McCall
(74) *Attorney, Agent, or Firm* — Cozen O'Connor

(57) ABSTRACT

A method for determining a deviation of a fuel quality from a reference quality and for determining a change in exhaust gas emissions caused by this deviation by evaluating pressure waves in a fuel system of an internal combustion engine outfitted with one of a discontinuous fuel delivery and a fuel take-off. The method includes detecting pressure oscillations in the fuel system during operation by at least one sensor; determining at least one of a fuel type and the deviation from a reference fuel quality by analyzing the detected pressure oscillations in an electronic monitoring unit; and at least one of changing behavior of an exhaust gas aftertreatment system downstream of the internal combustion engine based at least in part on deviations of the untreated emissions of the internal combustion engine from the untreated emissions occurring when using the reference fuel, changing service intervals when a deviation from the reference fuel quality is determined, changing engine oil change intervals are changed when a deviation from the reference fuel quality is determined displaying information about use of a fuel deviating from the reference fuel is, displaying the changed service interval, changing operating parameters of the internal combustion engine, and changing operating parameters of the exhaust gas aftertreatment system downstream of the internal combustion engine.

12 Claims, 5 Drawing Sheets

DETERMINATION OF FUEL CHARACTERISTICS AND THEIR INFLUENCE ON EXHAUST GAS EMISSIONS DURING OPERATION OF AN INTERNAL COMBUSTION ENGINE

BACKGROUND OF THE INVENTION

1. Field of the Invention

Alternative and synthetic fuels such as fatty acid methyl ester (FAME), vegetable oil, liquefied biomass (biomass-to-liquid [BTL]), liquefied gases (gas-to-liquid [GTL]), etc. are becoming increasingly important. However, with respect to their material properties such as density, viscosity, heat value and combustion value, thermal capacity, aromatics content, oxygen content, hydrogen content, carbon content, inorganic impurities (alkaline metals, alkaline earth metals), phosphorus content, sulfur content, storage life, boiling temperature, and sonic velocity, etc., they differ from the standardized, authorized fuels that are used for engine design and engine acceptance and which are required by law.

In order to detect this difference in fuel and respond to it if necessary, it would be useful to determine the fuel characteristics during operation.

2. Description of the Related Art

The emissions, exhaust gas temperatures, maximum engine output, and peak cylinder pressures change when internal combustion engines are operated with these non-standard fuels.

The altered exhaust gas emissions may exceed legally prescribed limits. $NO_x$ emissions, for example, are increased when using FAME, while particulate emissions decrease.

When catalytic converters are used, altered gas emissions may come about as a result of a decrease in the exhaust gas temperatures due to a deviating combustion value or delayed ignition that the light-off temperatures can no longer, or rarely, be achieved, which results in worsened emissions. On the other hand, an increase in exhaust gas temperatures can cause thermal damage to the catalytic converters.

At the same time, the use of biofuels lead to an accelerated chemical deactivation of the catalysts for aftertreatment of exhaust gas due to the increased amounts of alkaline metals and alkaline earth metals, phosphorous, and sulfur.

Since the fuel system and engine oil circuit are usually not hermetically isolated from one another, a mixing of fuel and engine oil results. Therefore, the use of unauthorized fuel leads to an uncontrollable change in the material properties of the engine oil, which can lead in turn to engine damage.

DE10346314A1 describes a generic sensor that can be used to determine the viscosity of fuel. For this purpose, the fuel is made to oscillate by an actuator and these oscillations are detected by a pressure sensor. The viscosity can be determined by evaluating the pressure curve. The disadvantage of this method consists in the need for an actuator which increases costs and makes maintenance more cumbersome.

DE10152236A1, DE10217376A1 and DE10217379A1 describe methods by which the fuel characteristics are determined from the vapor pressure of the fuel. For this purpose, the vapor pressure in the fuel tank and/or fuel system is determined. During this process, it is absolutely necessary that the engine does not take any fuel from the fuel system, i.e., the engine must be turned off. Therefore, this method cannot be used in engines which cannot be turned off such as engines for power units, combined heat and power plants, compressors, etc. Further, in order to determine the vapor pressure it is necessary to isolate the volume in which the pressure measurement is carried out from the environment or even to generate a slight vacuum pressure in this volume. This makes it necessary to use shutoff valves and/or vacuum pumps which results in high costs and correspondingly high maintenance expenses.

DE10015162A1 describes a method in which the combustion noise is detected and the quality of injection, i.e., the start of injection or rate of injection, is determined from this combustion noise. The drawback in this method consists in that the combustion noise cannot be used to determine the fuel being used because it is also influenced by a number of other factors such as tolerances, the degree of fouling or wear of the injection nozzle, injection pump, inlet valves, outlet valves, exhaust gas turbocharger, etc. Since the combustion noise largely depends upon the energy that is released, this method can only be used to determine the volumetric heat value, the start of injection or the injection rate with sufficient accuracy because of the customary volumetric addition of fuel to the combustion chamber. Since it is not possible to determine viscosity or compressibility, no definite conclusions may be drawn about what fuel is being used. Rather, this method is mainly used for improving smoothness of operation.

In DE19955796B4, fuels are distinguished by an angularly resolved measurement of the acceleration of the crankshaft and, therefore, of the energy released. Similar to Patent DE 10015162A1, this method only allows the volumetric heat value to be determined with sufficient accuracy, but determination of viscosity or compressibility is impossible. No definite conclusions can be reached about the fuel that is used. Rather, this method is again chiefly used to improve smoothness of operation.

DE4019083A1 describes a method in which the fuel quality is determined by a lambda sensor or fuel quality sensor, and the engine parameters are modified in accordance with this information. The disadvantage of these sensors consists in that they are very sensitive and expensive.

Further, the sensors are usually used to improve the smoothness of operation of the engine and/or the starting behavior. Adaptation of emissions is not described, nor is the effect of unauthorized fuel on engine oil characteristics.

SUMMARY OF THE INVENTION

It is an object of the invention to optimize the effect of the exhaust gas aftertreatment system and to detect the fuel characteristics in order to conserve this optimized effect.

The invention consists in deriving information about the type of fuel that is used and/or about the exhaust gas emissions from the pressure oscillations during discontinuous delivery and/or fuel take-off in the fuel system. These pressure oscillations are influenced by the density, viscosity, sound velocity, and compressibility of the fuel that is used. When these oscillations are picked up by a pressure sensor and evaluated in an electronic monitoring unit, a very simple and inexpensive possibility is provided for differentiating between different fuels. Using this information, conclusions can be reached about the exhaust gas emissions resulting from the fuel that is actually being used. When the unauthorized fuel leads to a prolonged and irreversible change in emissions, it is possible to assess these changes based on the determined type of fuel that is used and on the operating period.

The frequencies of the oscillations, also higher order oscillations, their maxima, the rise in pressure and/or drop in pressure can be used as variables for evaluation. A Fourier transformation, particularly a discrete and/or fast Fourier transform, of the measured pressure signal is carried out for a simple evaluation of the frequencies.

When the fuel delivery devices are already outfitted by design with a sensor on the high-pressure side, this sensor can be used to sense the pressure curve. This is the case, for example, in common rail systems in which the fuel is delivered at a determined pressure in a pressure accumulator, the so-called rail, and is supplied to the combustion chamber by injectors which are usually controlled individually. To ensure optimal performance of the system and prevent damage due to excessively high fuel pressures, the pressure is determined and adjusted on the high-pressure side.

Since the viscosity depends on the temperature of the medium, it is useful to determine the temperature of the fuel by means of a temperature sensor.

When the fuel is delivered at injection pressure, there is a rise in the fuel temperature due to the friction in the fuel pump and the performance of compression work. Since the rise in temperature depends upon the thermal capacity of the fuel, this can be used to further refine the determination of the type of fuel. For this purpose, the fuel temperature is determined on the low-pressure side and on the high-pressure side of the pump and the thermal capacity is determined from the temperature difference and the delivered fuel volume or mass flow of fuel.

The ambient temperature or the temperature in the fuel tank can also be used to determine the temperature on the low-pressure side in a first approximation.

When the fuel type and/or a deviation from the norm has been determined, this information can be stored in an electronic monitoring unit and, if necessary, read out at a later time.

Since the manufacturer's guarantee usually stipulates that internal combustion engine must be operated with authorized fuel, this function can serve to verify correct fueling.

It is also possible to display the fuel type and/or information about the use of unauthorized fuel by means of an optical display unit.

If a deviation in the exhaust gas emissions, due to the use of non-reference fuel is determined, it is possible to adapt these exhaust gas emissions to the emissions resulting when standard fuel is used by varying the operating parameters of the engine and/or of the aftertreatment system. The emissions can be matched to the level of the standard fuel by changing engine parameters such as injection time and/or injection pressure and/or intervals of split injections and/or injection periods of split injections and/or exhaust gas recirculation rate and/or fuel-to-air ratios.

When using an aftertreatment system to comply with emissions, the manipulated variables for complying with emissions can also be changed in a corresponding manner. For example, in SCR systems, i.e., with selective catalytic reduction of nitrogen oxides, the supplied amounts of reduction agent can be varied. In $NO_x$ storage catalytic converters and particulate filters, it is possible to change the ratio between storage and regeneration.

It is also conceivable to change engine parameters and aftertreatment parameters by changing the exhaust gas temperature and/or exhaust gas mass, e.g., through changes on the engine side such as changes to the injection time, injection quantity, injection intervals, exhaust gas recirculation rate, etc. Since the temperature and the exhaust gas mass conducted through the aftertreatment system are closely related to achievable throughputs, this results in a changed throughput capacity of the aftertreatment system.

Further, it is conceivable to gain information about the long-term change in exhaust gas emissions based on the duration and/or cumulative amount of unauthorized fuel. This can be caused, for example, by increased coking of the injection nozzles and/or an accelerated chemical deactivation of the aftertreatment system. Because of this irreversible damage, subsequent use of authorized fuel usually no longer results in the emissions that were achieved prior to the use of the unauthorized fuel.

It is conceivable to take countermeasures by changing the operating parameters of the engine and/or of the aftertreatment system.

When the engine is operated with unauthorized fuel, it may be necessary to shorten the intervals between regular servicing, e.g., oil changes or replacement and cleaning of injection nozzles, compressors, radiators, etc., because otherwise a long-term change in emissions will result. Determining these changed service intervals and relaying them to the operator presents another possible application of the method.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

To further explain the control sequences mentioned above, some of these processes will be described in the following by way of example with reference to block diagrams in FIGS. 1 to 5. The described control sequences are preferably embedded in prioritized control routines which are carried out by an electronic engine control system typically provided in modern engines for controlling the engine.

Figure 1:
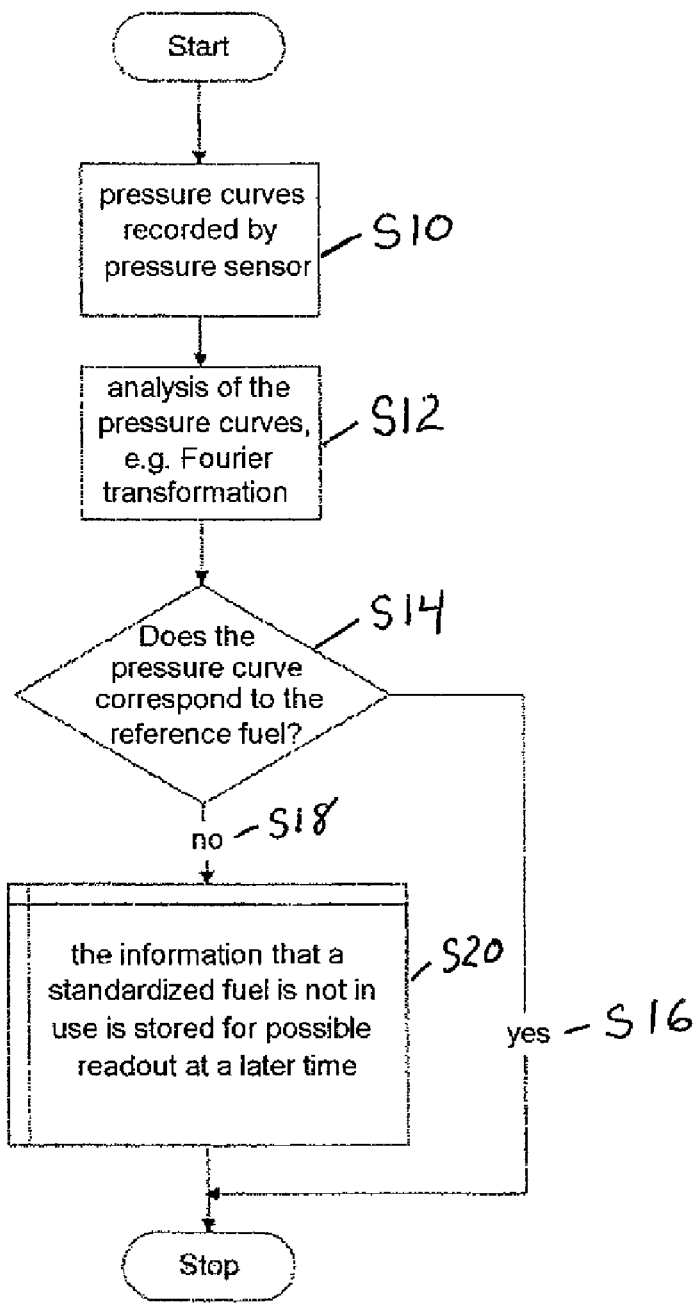
FIG. 1 is a flowchart for analyzing fuel.

The block diagram in FIG. 1 shows a procedure for determining the use of an unauthorized fuel and the storage of this information for retrieval at a later time.

After the start of the control sequence, pressure curves in the fuel system are recorded at predetermined times by one or more pressure sensors (S10). The times are selected in such a way that it is possible to gain information about the fuel in the fuel system by means of the pressure curves. In the next step (S12), the determined pressure curve is processed by an analysis method, e.g., a Fourier transformation of the pressure curve, such that the acquired information can be compared in a simple manner to stored characteristic information about an authorized reference fuel. This comparison takes place in the next step (S14). Depending upon the results of the comparison, the control sequence is terminated when the obtained information matches the stored information (S16). In the absence of a match (S18), the information that an authorized fuel is not being used is saved (S20). It would be conceivable, parallel to this, to save the time at which the non-match was determined because corresponding engine control systems usually contain a time recorder which can be interrogated to determine the time. After saving, the control sequence is also terminated.

The fact that an unauthorized fuel was used and, as the case may be, the duration of use can be ascertained by interrogating the stored values at a later time.

Figure 2:
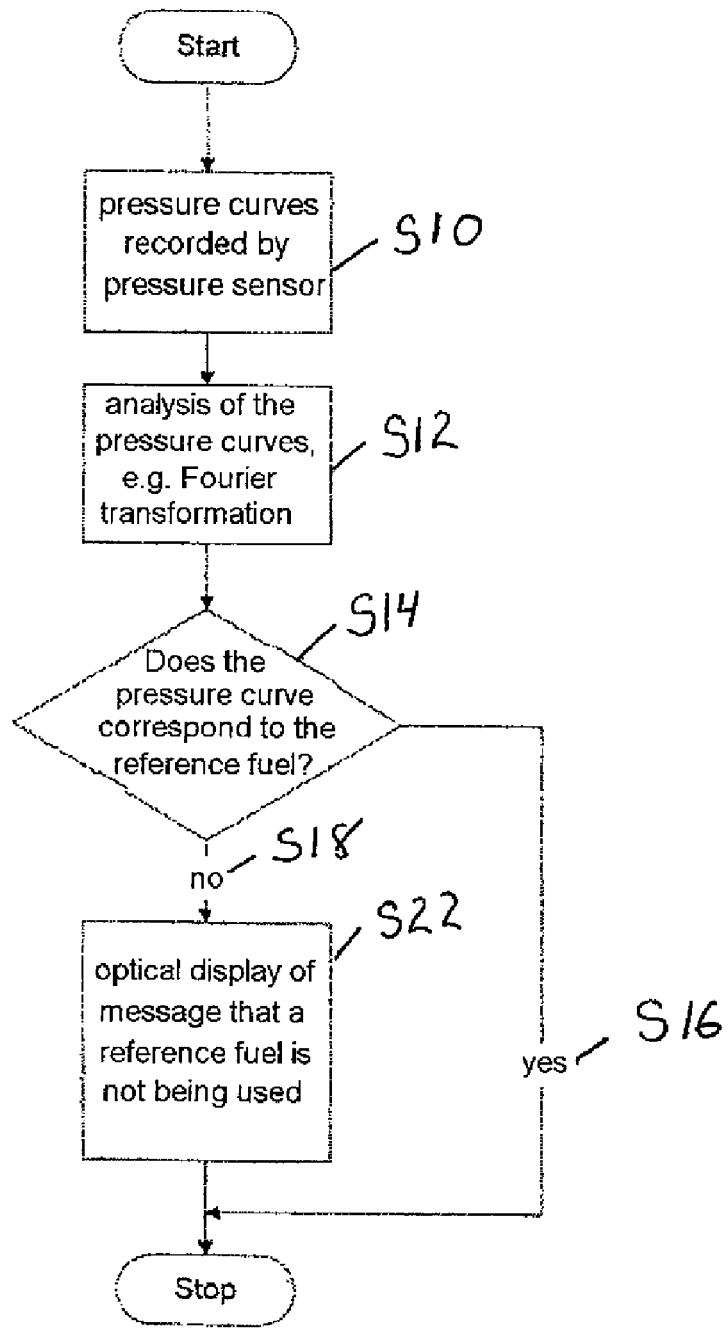
FIG. 2 is a flowchart for a control sequence.

In a modification of the example described above, the fact that an unauthorized fuel is used is directly indicated, e.g., in order to inform or warn an operator. FIG. 2 shows such control sequence. In this case, the first three control steps are identical to those described in the block diagram shown in FIG. 1. Reference is had to the corresponding parts of the specification. When the obtained information matches the stored information, the control sequence is concluded. However, when there is no match, a prompt is given to the effect that an authorized fuel is not being used (S22). The prompt can be carried out optically and/or acoustically and/or tactilely and can persist as long as the unauthorized fuel remains in the fuel system.

Of course, it is also conceivable to combine the control sequences in the block diagrams shown in FIGS. 1 and 2, in which case the control step for saving the information that an authorized fuel is not in use (S20) and the control step for indicating this fact (S22) are carried out in parallel or successively.

As was already described above, the use of an unauthorized fuel can lead to a reduction in the intervals between servicing, e.g., of an engine-powered vehicle. In order to meet this risk, it is possible, as is shown in the block diagram according to FIG. 3, to calculate the reduction in the service intervals (S30) in a corresponding control step after it has been determined that an unauthorized fuel is being used and to display the new calculated service interval (S32) in a further control step. The control steps for determining the fact that an unauthorized fuel is being used are identical to the corresponding control steps described in connection with the block diagram shown in FIG. 1 so that further description is unnecessary.

Figure 3:
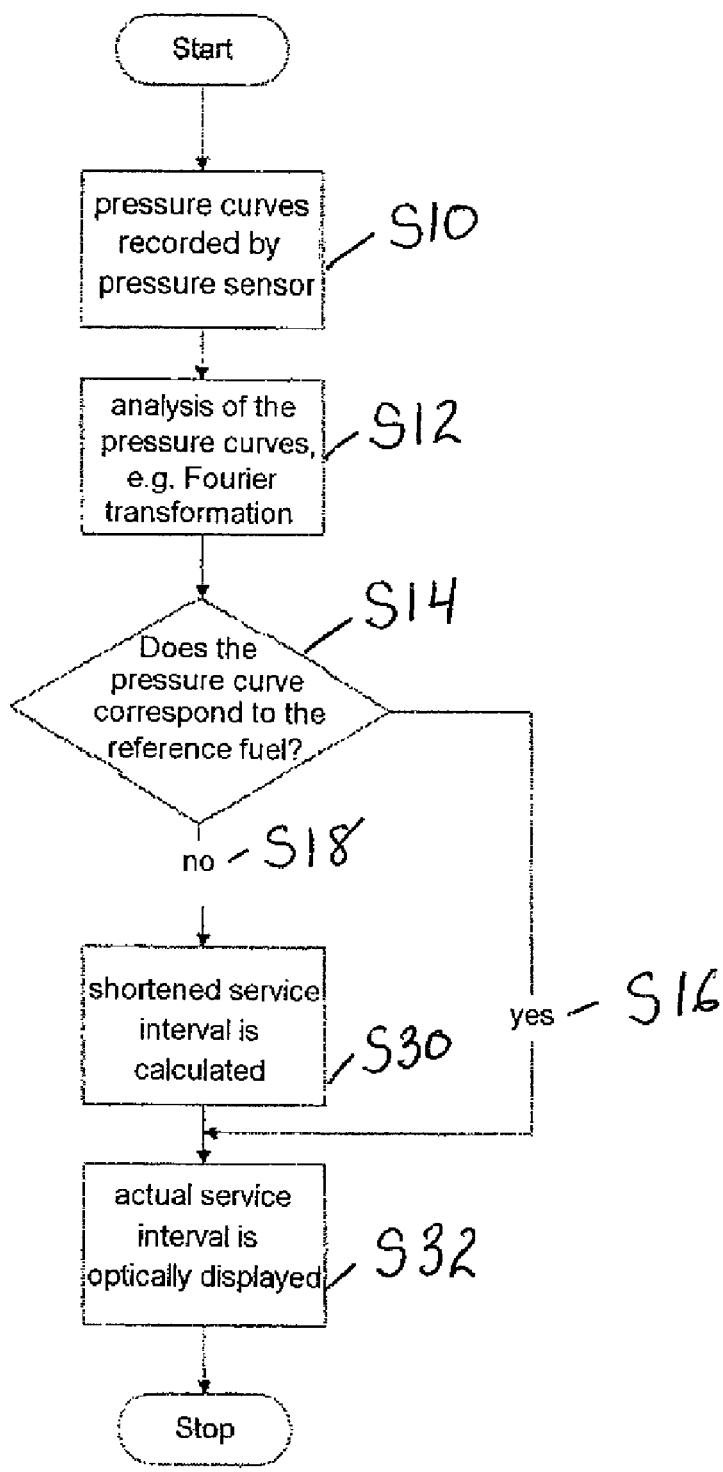
FIG. 3 is a flowchart for a control sequence.

Of course, the control sequence in the block diagram shown in FIG. 3 can be combined with the control sequences in the block diagrams shown in FIG. 1 and/or FIG. 2.

Further, as was also already mentioned above, when an unauthorized fuel is being used in an engine it is necessary to adapt the operating parameters of the engine and/or of the exhaust gas aftertreatment system by changing the settings, e.g., in order to comply with the permissible emissions of an engine. A corresponding control sequence is shown in the block diagram in FIG. 4.

In this example also, it must first be ascertained whether or not the determined pressure curve corresponds to the pressure curve of the reference fuel. The control steps to be carried out for this purpose are identical to those corresponding to the block diagram shown in FIG. 1. Therefore, reference is had in this respect to the parts of the specification referring to FIG. 1. If it is ascertained that the determined pressure curve does not correspond to the pressure curve of the reference fuel, the harmful emissions can be restored to a permissible level in a further control step using stored settings and/or by control loops which can be activated (S40). Corresponding regulating or controlling mechanisms have been extensively described in the technical literature so that no further explanation is required. Engine operating parameters which can be used for minimizing pollutants include the injection time, injection quantity, injection interval, exhaust gas recirculation rate, exhaust gas temperature, exhaust gas mass, and so on.

Figure 5:
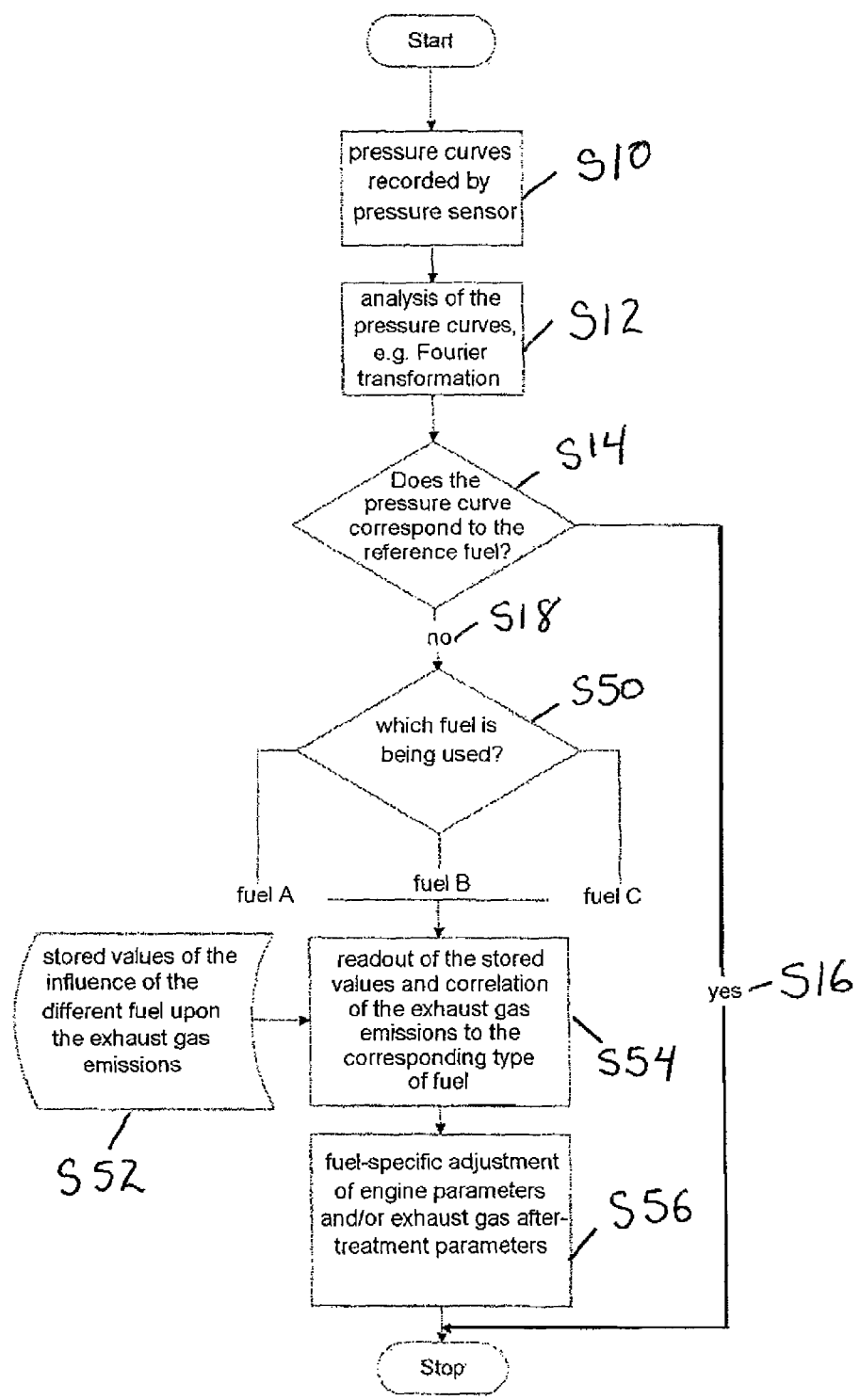
FIG. 5 is a flowchart for a control sequence.

Since the number of usable fuels which are commercially available is limited, the example according to the block diagram shown in FIG. 5 can also be used to adjust the operating parameters of the internal combustion engine or the exhaust gas aftertreatment system of the internal combustion engine. The control sequence shown therein is identical to that described in connection with the block diagram shown in FIG. 1 with respect to the first steps up to and including the interrogation as to whether or not the determined pressure curve matches the pressure curve of the reference fuel. Again, reference is had to the corresponding description referring to the example in FIG. 1. If the above-mentioned interrogation establishes that the determined pressure curve does not match the pressure curve of the reference fuel, another comparison is made to other stored pressure curves which correspond to known fuels (S50), (S52). If a match is found, the associated operating parameters for the engine and, as the case may be, for the exhaust gas aftertreatment system are read out of a storage (S54) and used to control the engine and exhaust gas aftertreatment system so that a fuel-specific adjustment of the engine and exhaust gas aftertreatment parameters is carried out (S56).

Figure 4:
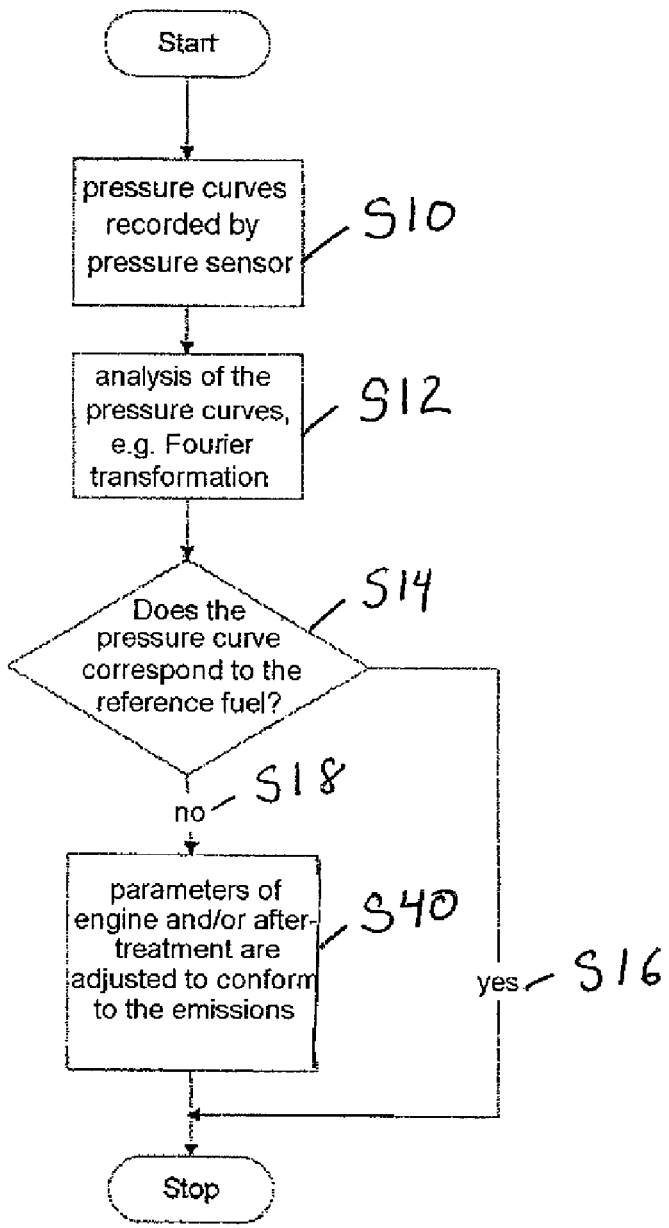
FIG. 4 is a flowchart for a control sequence.

Of course, the control sequences in the block diagrams shown in FIGS. 4 and 5 can be combined so that it is also possible to minimize pollutants as in the example shown in FIG. 4 in case of the presence of an unknown fuel.

Further, the control sequences according to FIGS. 4 and 5 or a combination of these control sequences can be selectively combined with the control sequences according to FIGS. 1 to 3.

Thus, while there have shown and described and pointed out fundamental novel features of the invention as applied to a preferred embodiment thereof, it will be understood that various omissions and substitutions and changes in the form and details of the devices, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. A method for determining a deviation of a fuel quality from a reference fuel quality and for determining a change in exhaust gas emissions caused by this deviation by evaluating pressure waves in a fuel system of an internal combustion engine outfitted with one of a discontinuous fuel delivery and a fuel take-off, the method comprising:
    detecting pressure oscillations in the fuel system during operation by at least one sensor;
    determining the deviation of the fuel quality from the reference fuel quality by analyzing the detected pressure oscillations in an electronic monitoring unit;
    determining, from the deviation of the fuel quality from the reference fuel quality, at least one of:
        deviations of the untreated emissions of the internal combustion engine from the untreated emissions occurring when using the reference fuel, and
        influences on the behavior of an aftertreatment system downstream of the internal combustion engine, which behavior is changes in comparison to the operation with the reference fuel, based on the deviation of the fuel quality from the reference fuel quality, at least one of:
  determining a change in service intervals,
  displaying information about use of a fuel deviating from the reference fuel,
  if the change in service intervals is determined, then displaying the changed service interval,
  changing operating parameters of the internal combustion engine, and
  changing operating parameters of the exhaust gas aftertreatment system downstream of the internal combustion engine; and
wherein emissions resulting when a non-reference fuel is used are adapted to the emissions resulting when the reference fuel is used by changing an amount of reduction agent supplied when using a catalytic converter for selective catalytic reduction of nitrogen oxides.

2. The method according to claim 1, wherein a temperature difference between a low-pressure side of the fuel delivery device and a high-pressure side of the fuel delivery device is determined by at least one sensor, the determining the deviation of the fuel quality from the reference fuel quality is based at least in part on the temperature difference.

3. The method according to claim 1, wherein operating parameters of the aftertreatment system are modified based at least in part on the information obtained from the pressure oscillations so that the emissions are at least approximated to those resulting when the reference fuel is used.

4. The method according to claim 1, wherein emissions resulting when a non-reference fuel is used are adapted to the emissions resulting when the reference fuel is used in that exhaust gas temperatures are changed by changing the operating parameters of the internal combustion engine when an aftertreatment system is used.

5. The method according to claim 1, wherein the information gained from the pressure oscillations is optically displayed.

6. The method according to claim 1, wherein the information gained from the pressure oscillations is stored.

7. The method according to claim 1, wherein the detected pressure oscillations undergo at least one of a Fourier transformation, a discrete Fourier transformation, and a fast Fourier transformation for analysis in an electronic control unit.

8. The method according to claim 1, further comprising the step of determining a fuel type by analyzing the detected pressure oscillations in the electronic monitoring unit.

9. The method according to claim 1, wherein at least one of a duration of the deviation of the fuel quality, a frequency of the deviation of the fuel quality, a first occurrence of the deviation of the fuel quality, a final occurrence of the deviation of the fuel quality, and a type of fuel is stored in an electronic monitoring unit.

10. The method according to claim 9, wherein a determination regarding a degree of at least one of a chemical deactivation of the aftertreatment system, a thermal deactivation of the aftertreatment system and a long-term change in the emissions is based at least in part on the stored information.

11. A method for determining a deviation of a fuel quality from a reference fuel quality and for determining a change in exhaust gas emissions caused by this deviation by evaluating pressure waves in a fuel system of an internal combustion engine outfitted with one of a discontinuous fuel delivery and a fuel take-off, the method comprising:
  detecting pressure oscillations in the fuel system during operation by at least one sensor;
  determining the deviation of the fuel quality from the reference fuel quality by analyzing the detected pressure oscillations in an electronic monitoring unit;
  determining, from the deviation of the fuel quality from the reference fuel quality, at least one of:
    deviations of the untreated emissions of the internal combustion engine from the untreated emissions occurring when using the reference fuel, and
    influences on the behavior of an aftertreatment system downstream of the internal combustion engine, which behavior is changes in comparison to the operation with the reference fuel,
  based on the deviation of the fuel quality from the reference fuel quality, at least one of:
    determining a change in service intervals,
    displaying information about use of a fuel deviating from the reference fuel,
    if the change in service intervals is determined, then displaying the changed service interval,
    changing operating parameters of the internal combustion engine, and
    changing operating parameters of the exhaust gas aftertreatment system downstream of the internal combustion engine; and
  wherein emissions resulting when a non-reference fuel is used are adapted to the emissions resulting when the reference fuel is used by changing the ratios between rich and lean operating phases when an $NO_x$ storage catalytic converter is used for reducing nitrogen oxides.

12. A method for determining a deviation of a fuel quality from a reference fuel quality and for determining a change in exhaust gas emissions caused by this deviation by evaluating pressure waves in a fuel system of an internal combustion engine outfitted with one of a discontinuous fuel delivery and a fuel take-off, the method comprising:
  detecting pressure oscillations in the fuel system during operation by at least one sensor;
  determining the deviation of the fuel quality from the reference fuel quality by analyzing the detected pressure oscillations in an electronic monitoring unit;
  determining, from the deviation of the fuel quality from the reference fuel quality, at least one of:
    deviations of the untreated emissions of the internal combustion engine from the untreated emissions occurring when using the reference fuel, and
    influences on the behavior of an aftertreatment system downstream of the internal combustion engine, which behavior is changes in comparison to the operation with the reference fuel,
  based on the deviation of the fuel quality from the reference fuel quality, at least one of:
    determining a change in service intervals,
    displaying information about use of a fuel deviating from the reference fuel,
    if the change in service intervals is determined, then displaying the changed service interval,
    changing operating parameters of the internal combustion engine, and
    changing operating parameters of the exhaust gas aftertreatment system downstream of the internal combustion engine; and
  wherein emissions resulting when a non-reference fuel is used are adapted to the emissions resulting when the reference fuel is used by changing intervals between soot storage and particulate filter regeneration when using a particulate filter for removal of soot particles.

* * * * *